(12) United States Patent
Kim et al.

(10) Patent No.: US 11,954,915 B2
(45) Date of Patent: Apr. 9, 2024

(54) METHOD FOR DETECTING GUARD-RAIL USING LIDAR SENSOR AND GUARD-RAIL DETECTION DEVICE PERFORMING THE METHOD

(71) Applicant: Vueron Technology Co., Ltd, Seoul (KR)

(72) Inventors: Jaekwang Kim, Bucheon-si (KR); Seungyong Lee, Goyang-si (KR)

(73) Assignee: Vueron Technology Co., Ltd, Seoul (KR)

( * ) Notice: Subject to any disclaimer, the term of this patent is extended or adjusted under 35 U.S.C. 154(b) by 352 days.

(21) Appl. No.: 17/462,340

(22) Filed: Aug. 31, 2021

(65) Prior Publication Data
US 2023/0069618 A1 Mar. 2, 2023

(30) Foreign Application Priority Data
Aug. 25, 2021 (KR) ........................ 10-2021-0112085

(51) Int. Cl.
*G06V 20/58* (2022.01)
*G01S 7/48* (2006.01)
*G01S 17/931* (2020.01)

(52) U.S. Cl.
CPC ............ *G06V 20/58* (2022.01); *G01S 17/931* (2020.01); *G01S 7/4808* (2013.01)

(58) Field of Classification Search
CPC ...... G06V 20/58; G01S 17/931; G01S 7/4808
See application file for complete search history.

(56) References Cited

U.S. PATENT DOCUMENTS

2022/0207883 A1* 6/2022 Watanabe ............... G06F 18/22

FOREIGN PATENT DOCUMENTS

JP 2009-204615 A 9/2009
KR 10-2015-0083545 A 7/2015

* cited by examiner

*Primary Examiner* — Diane D Mizrahi
(74) *Attorney, Agent, or Firm* — Bridgeway IP Law Group, PLLC; Jihun Kim

(57) ABSTRACT

A method for detecting a guard-rail on a road, which is performed by a guard-rail detection device, is provided. The method includes acquiring points around a lidar sensor from the lidar sensor, detecting ground points based on the acquired points, arranging, among the acquired points, first points that are different from the detected ground points in voxels forming a sphere, and detecting the guard-rail based on the voxels and the first points.

19 Claims, 10 Drawing Sheets

METHOD FOR DETECTING GUARD-RAIL USING LIDAR SENSOR AND GUARD-RAIL DETECTION DEVICE PERFORMING THE METHOD

CROSS-REFERENCE TO RELATED APPLICATION

This application claims priority to Korean Patent Application No. 10-2021-0112085, filed on Aug. 25, 2021. The entire contents of the application on which the priority is based are incorporated herein by reference.

TECHNICAL FIELD

The present disclosure relates to a method for detecting a guard-rail using a LIDAR(laser imaging detection and ranging) sensor and a guard-rail detection device performing the method.

BACKGROUND

A guard-rail generally indicates a structure installed on a road for preventing accidents caused from a fall-down of a vehicle or a violation of the center line. The guard-rail is an important structure for the road safety by preventing a secondary accident caused from a lane departure and a serious accident caused from the violation of the center line.

Recognizing an accurate position of the vehicle (vehicle localization) is important in autonomous driving and an ADAS system in order to drive the vehicle using sensors installed at the vehicle. It is possible to recognize a width of a lane and the number of lanes using the guard-rail, by which it is possible to generate a route for autonomous driving. Further, it is also important to determine areas including the guard-rail in which the vehicle cannot be driven. In performing more accurate vehicle localization for autonomous driving, it is possible to recognize the position of the vehicle by comparing pre-existing information of the guard-rail stored in a high definition map with current information of the guard-rail. Like this, the guard-rail is an important regional characteristic that can be used to perform limiting the areas in which the vehicle can be driven and to recognize the position of the vehicle. The guard-rail usually exists at an edge of a road or a bridge, but may be installed at a center of the road to prevent the violation of the center line. It is essential for autonomous driving to detect the position of the guard-rail and to control the vehicle in consideration of the position of the guard-rail.

According to a conventional (existing) guard-rail detecting method, the guard-rail is detected by a camera. In the conventional method, after searching for drivable areas with camera, a boundary is detected as the guard-rail or the guard-rail is detected using information of an edge. However, this method has a drawback that the guard-rail is detected well only in the daytime of nice weather since the camera is greatly influenced by a change of illuminance. Further, since there are many cases that a guard-rail shown by the camera has a similar characteristic with a lane line, the camera may falsely detect the lane line as the guard-rail.

In contrast, a conventional (existing) guard-rail detecting method using LIDAR data, a method of comparing between same layers based on the layer information of points. This method has a drawback that the algorithm can be applied only after recognizing sensor input information or layer information and a drawback that the speed is low since it uses information of all the points.

Accordingly, there arises a demand for a guard-rail detecting method without layer information or with a high speed.

SUMMARY

In view of the above, the present disclosure provides a method for detecting a guard-rail on a road by using point data.

Technical objects to be achieved by the present disclosure are not limited to those described above, and other technical objects not mentioned above may also be clearly understood from the descriptions given below by those skilled in the art to which the present disclosure belongs.

In accordance with an aspect of the present disclosure, there is provided a method for detecting a guard-rail on a road, which is performed by a guard-rail detection device, the method including: acquiring points around a LIDAR sensor from the LIDAR sensor; detecting ground points based on the acquired points; arranging, among the acquired points, first points that are different from the detected ground points in voxels forming a sphere; and detecting the guard-rail based on the voxels and the first points.

Further, the detecting of the guard-rail may include: generating a plurality of voxel groups by classifying voxels, having a same theta direction coordinate and a same phi direction coordinate, as a same group among the voxels in which the first points are arranged; selecting the closest voxel from the LIDAR sensor among the voxels in each of the plurality of voxel groups as a directional representative voxel for each of the plurality of voxel groups; determining whether the respective directional representative voxels for the plurality of voxel groups satisfy planeness; selecting, among the respective directional representative voxels for the plurality of voxel groups, directional representative voxels satisfying planeness as guard-rail candidate voxels; and selecting a guard-rail candidate by connecting the guard-rail candidate voxels.

Further, the determining of whether the respective directional representative voxels for the plurality of voxel groups satisfy planeness may include selecting, among a plurality of points positioned in each of the respective directional representative voxels for the plurality of voxel groups, a directional representative point for each of the directional representative voxels.

Further, the determining of whether the respective directional representative voxels for the plurality of voxel groups satisfy planeness may include: for each of the directional representative voxels, selecting a first voxel that is a directional representative voxel having a same phi direction coordinate as the corresponding directional representative voxel and having a theta direction coordinate that is larger than that of the corresponding directional representative voxel, and a second voxel that is a directional representative voxel having a same phi direction coordinate as the corresponding directional representative voxel and having a theta direction coordinate that is smaller than that of the corresponding directional representative voxel, and determining whether the corresponding directional representative voxel satisfies a line fitting condition for a first straight line generated by a predetermined first rule in the theta direction; selecting a third voxel that is a directional representative voxel having a same theta direction coordinate as the corresponding directional representative voxel and having a phi direction coordinate that is larger than that of the corresponding directional representative voxel, and a fourth voxel that is a directional representative voxel having a same theta direction coordinate as the corresponding directional representative voxel and having a phi direction coordinate smaller than that of the corresponding directional representative voxel, and determining whether the corresponding directional representative voxel satisfies a line fitting condition for a second straight line generated by a predetermined second rule in the phi direction; and, when the corresponding directional representative voxel satisfies the line fitting condition for the first straight line and the line fitting condition for the second straight line, determining that the corresponding directional representative voxel satisfies planeness.

Further, the first straight line may be generated by connecting the directional representative point of the first voxel and the directional representative point of the second voxel, and the determining of whether the corresponding directional representative voxel satisfies the line fitting condition for the first straight line may include determining that the corresponding directional representative voxel satisfies the line fitting condition for the first straight line when a distance between the directional representative point of the corresponding directional representative voxel and the first line is equal to or less than a predetermined distance.

Further, the second straight line may be generated by connecting the directional representative point of the third voxel and the directional representative point of the fourth voxel, and the determining of whether the corresponding directional representative voxel satisfies the line fitting condition for the second straight line may include determining that the corresponding directional representative voxel satisfies the line fitting condition for the second straight line when a distance between the directional representative point of the corresponding directional representative voxel and the second line is equal to or less than a predetermined distance.

Further, the first voxel and the second voxel may be adjacent to the corresponding directional representative voxel, and the third voxel and the fourth voxel may be adjacent to the corresponding directional representative voxel.

Further, the guard-rail candidate selected in the selecting of the guard-rail candidate may be formed by connecting the guard-rail candidate voxels adjacent to each other in an extended direction.

The method may further include detecting, as the guard rail, the guard-rail candidate having a width in a direction parallel to a ground and perpendicular to the extended direction and having a length in the extended direction, the width being equal to or less than a predetermined width and the length being equal to or larger than a predetermined length.

In accordance with another aspect of the present disclosure, there is provided a guard-rail detection device including: a LIDAR sensor configured to acquire points around the LIDAR sensor; and a processor configured to detect ground points based on the acquired points, arrange, among the acquired points, first points that are different from the detected ground points in voxels forming a sphere, and detect a guard-rail based on the voxels and the first points.

In accordance with still another aspect of the present disclosure, there is provided a non-transitory computer-readable storage medium storing computer-executable instructions which cause, when executed by a processor, the processor to perform a method for detecting a guard-rail on a road by using a guard-rail detection device, the method including: acquiring points around a LIDAR sensor from the LIDAR sensor; detecting ground points based on the acquired points; arranging, among the acquired points, first points that are different from the detected ground points in voxels forming a sphere; and detecting the guard-rail based on the voxels and the first points.

According to the embodiment of the present disclosure, by arranging point data received from a LIDAR sensor in voxels forming a sphere and detecting the guard-rail by units of voxels, it is possible to rapidly and accurately detect the guard-rail without using all of the point data. That is, it is possible to increase the safety of autonomous driving by accurately detecting the guard-rail, and it is possible to provide a processing method suitable for operating a real time control system by rapidly processing the data.

DETAILED DESCRIPTION

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1:
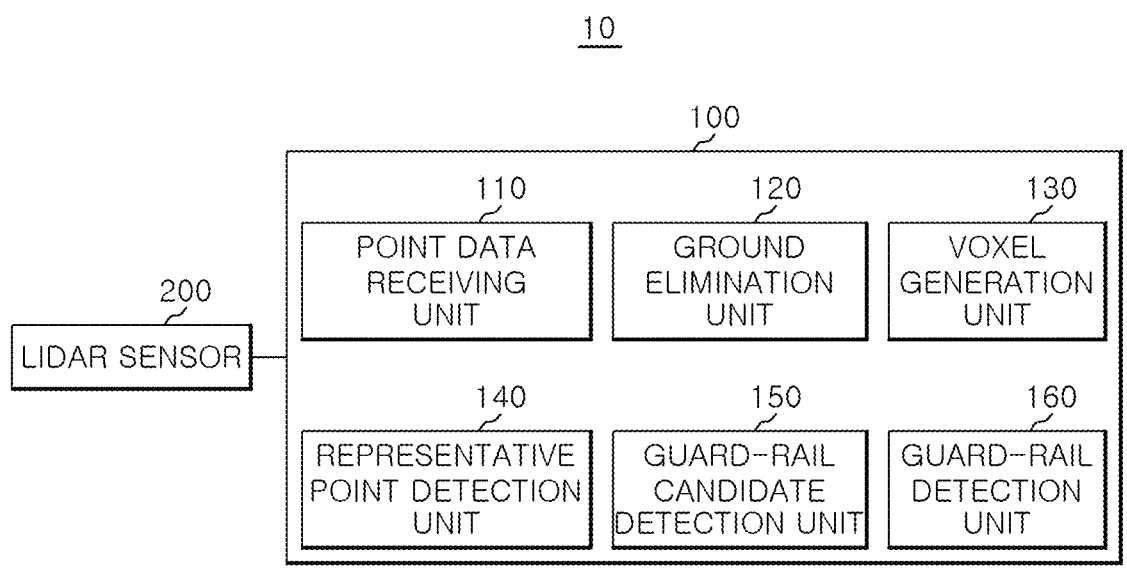
FIG. 1 is a block diagram illustrating a guard-rail detection device according to an embodiment of the present disclosure.

FIG. 1 is a block diagram illustrating a guard-rail detection device according to an embodiment of the present disclosure.

Referring to FIG. 1, a guard-rail detection system 10 may include a guard-rail detection device 100 and a LIDAR sensor 200.

In the present disclosure, for the sake of convenience of description, a case where the guard-rail detection system 10 is installed in an autonomous vehicle (hereinafter simply referred to as a vehicle) is mainly described. However, the present disclosure is not limited thereto. For example, the guard-rail detection system 10 may be installed in an unmanned moving object such as a drone or other moving objects such as a vehicle, a motorcycle, a flight vehicle, and the like as well as the autonomous vehicle.

In addition, in the present disclosure, a case where the LIDAR sensor 200 is provided separately from the guard-rail detection device 100 to transmit point data to the guard-rail detection device 100 is mainly described. However, the present disclosure is not limited thereto. For example, the guard-rail detection device 100 may include the LIDAR sensor 200. In this case, the LIDAR sensor 200 may transmit the point data to a point data receiving unit 110 which will be described later through internal signaling.

The LIDAR sensor 200 may emit a laser beam (light pulse) in a predetermined direction and receive a reflected (or backscattered) laser beam from surrounding terrain and objects. The LIDAR sensor 200 may collect point data through the reflected laser beam. Here, the point data may be a point cloud of individual points belonging to a certain coordinate system. In a three-dimensional coordinate system, a point is usually defined by X, Y, and Z coordinates, and is often used to indicate a surface of an object.

A guard-rail detection device 100 may receive the point data from the LIDAR sensor 200 and use the received point data to detect a guard-rail around the guard-rail detection device 100 or around the vehicle on which the guard-rail detection device 100 is mounted.

Specifically, the guard-rail detection device 100 may include a point data receiving unit 110, a ground elimination unit 120, a voxel generation unit 130, a representative point detection unit 140, a guard-rail candidate detection unit 150, and a guard-rail detection unit 160, which are conceptually indicating functions for detecting the guard-rail.

The point data receiving unit 110 may receive the point data collected by the LIDAR sensor 200. Then, the ground elimination unit 120 may detect a ground on a road using the point data received by the point data receiving unit 110. The ground elimination unit 120 may detect the ground using a known technique as a method for detecting the ground. The known technique includes various methods such as a plane fitting, a ground detection based on a grid map, and the like. However, the present disclosure is not limited thereto, and the method for detecting the ground may include additional various methods.

Figure 2A:
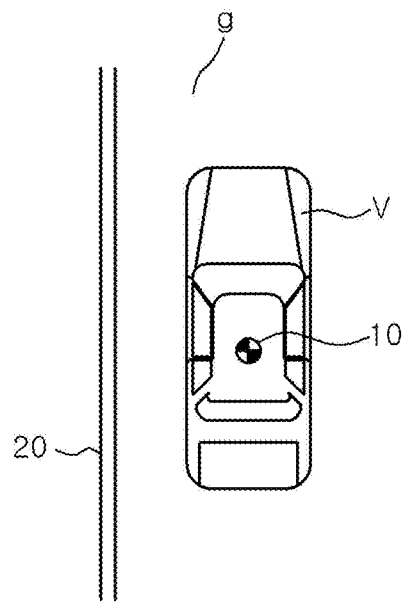
FIG. 2A is an example illustrating a position and a shape of the guard-rail installed on a road.
Figure 2B:
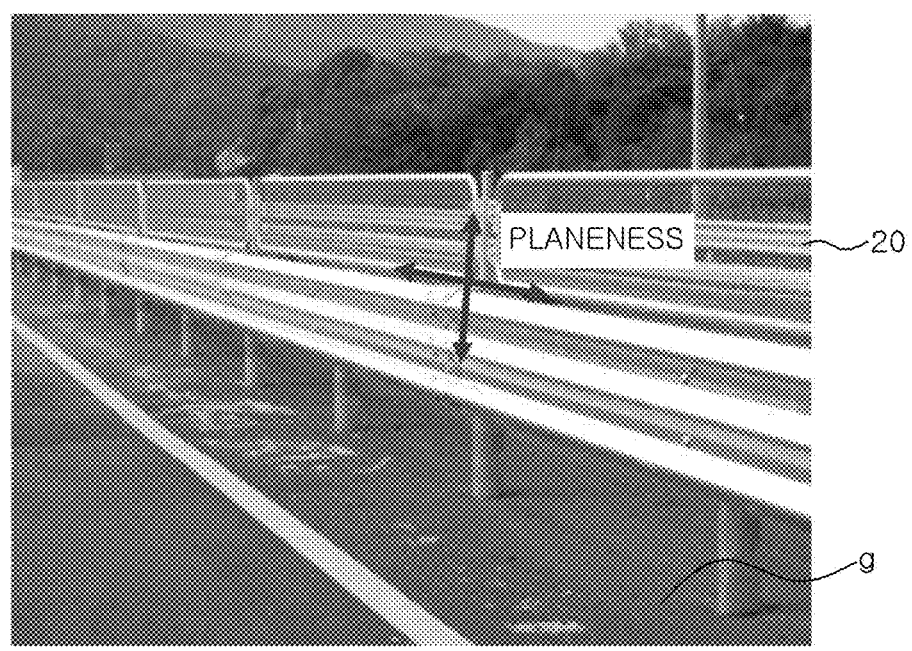
FIG. 2B is an example illustrating a position and a shape of the guard-rail installed on a road.

For example, the ground elimination unit 120 may solve a plane equation corresponding to the ground through a plane fitting in the distribution of the received point data, calculate a distance between the plane and each point of the point data, detect points on which the ground is positioned by determining that points positioned close to the plane are the points on which the ground is positioned, and eliminate the points on which the ground is positioned FIGS. 2A and 2B are examples illustrating a position and a shape of the guard-rail installed on a road.

Referring to FIG. 2A, the guard-rail 20 is positioned at an area that is not covered by objects around the vehicle traveling on the road when viewed from the LIDAR sensor 200.

Further, referring to FIG. 2B, the guard-rail may be positioned on an imaginary plane extended in a direction which is perpendicular to the ground (g).

Thus, according to the embodiment of the present disclosure, after the guard-rail detection device 100 receives the point data from the LIDAR sensor 200, the guard-rail detection device 100 may determine that a spot on which the closest point to the LIDAR sensor 200 is positioned among first points that are not determined as points corresponding to the ground as the position of the guard-rail. Further, the guard-rail detection device 100 may determine whether the guard-rail is positioned on such a point using a characteristic that the guard-rail is positioned on the imaginary plane, and may detect the guard-rail.

Figure 3A:
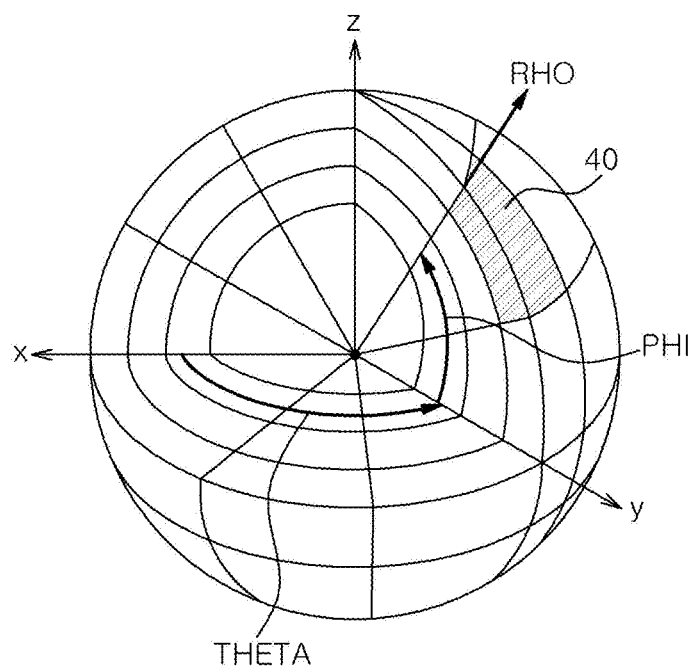
FIG. 3A illustrates voxels forming a sphere generated according to the embodiment of the present disclosure.
Figure 3B:
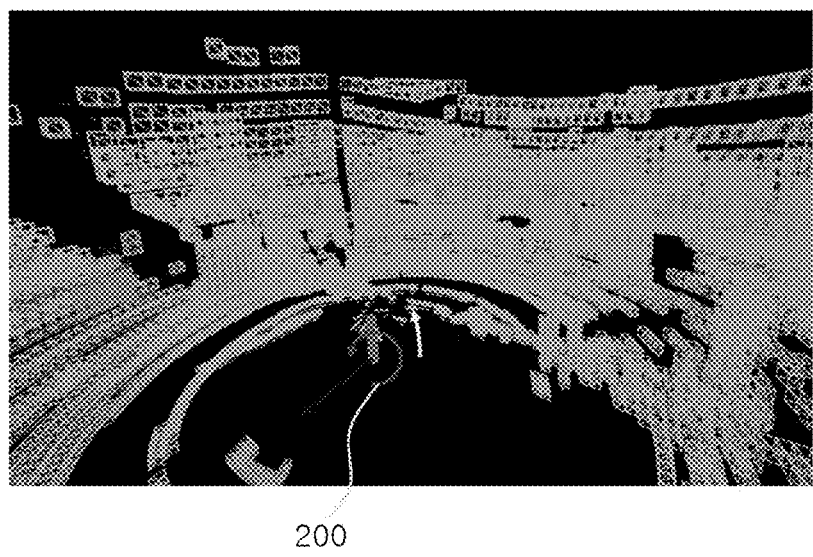
FIG. 3B illustrates voxels forming a sphere generated according to the embodiment of the present disclosure.

FIGS. 3A and 3B illustrate voxels forming a sphere generated according to the embodiment of the present disclosure.

Referring to FIGS. 3A and 3B, the voxel generation unit 130 may generate voxels forming a sphere and arrange the point data in the generated voxels. After that, the voxel generation unit 130 may store point data positioned in each voxel.

For example, the voxel generation unit 130 may generate voxels forming a sphere around the LIDAR sensor 200. For the sake of convenience of description, a case where a sphere of the voxels is generated around the LIDAR sensor 200 that is a center of the sphere is described. However, the present disclosure is not limited thereto. The guard-rail detection device 100 or a center of the vehicle may be positioned at the center of the sphere.

The coordinate system used in the voxels forming the sphere may include a distance component from the center indicated by rho, a direction component indicated by theta and a direction component indicated by phi. Here, the theta direction may indicate a magnitude of an angle measured in a clockwise direction from 0 degrees of x-axis on the x-y plane of the orthogonal coordinates system, which is parallel to the ground (g), and the phi direction may indicate a magnitude of an angle measured in a clockwise direction from 0 degrees of y-axis on the y-z plane of the orthogonal coordinates system, which is perpendicular to the ground (g).

Further, the voxel generation unit 130 may generate a plurality of voxels 40 by dividing the voxels into predetermined rho direction component distance units, predetermined theta direction component units, and predetermined phi direction component units, and position the first point data inside each voxel 40. Further, the voxel generation unit 130 may indicate the coordinates of the voxel as "$R_k$, $T_m$, $P_n$," if the voxel is positioned in $k^{th}$ position in the rho direction from the center, $m^{th}$ position in the theta direction from x-axis, and $n^{th}$ position in the phi direction from y-axis.

Then, the guard-rail detection device 100 may detect the guard-rail without determining every point data and without layer information of the point data, using the generated voxels 40 and the first point data located inside the voxels 40.

A method for detecting guard-rail candidate voxels and a method for detecting the guard-rail will be described below.

The representative point detection unit 140 may select each directional representative voxel among a plurality of voxels generated by the voxel generation unit 130, and detect each directional representative point among the first points located in each directional representative voxel. Here, each direction may be indicated as "T, P" direction including a theta direction component and a phi direction component except a rho direction component.

More specifically, the representative point detection unit 140 may classify the voxels having the same theta direction coordinate and the same phi direction coordinate in which the first points are positioned as the same group using the coordinates of each voxel, in order to select each directional representative voxel. For example, the representative point detection unit 140 may classify the voxels positioned in "$T_m$, $P_n$" direction (i.e., positioned in $m^{th}$ position in the theta direction from x-axis, and $n^{th}$ position in the phi direction from y-axis) as the same group.

Then, the representative point detection unit 140 may select the closest voxel from the center position in each generated group as the directional representative group. For example, if a voxel positioned in $k^{th}$ position in the rho direction from the center is the voxel located closest to the center position among a group of voxels positioned in "$T_m$, $P_n$" direction, the representative point detection unit 140 may select a voxel positioned in "$R_k$, $T_m$, $P_n$" as the directional representative voxel in "$T_m$, $P_n$" direction.

Since there is generally no other object between the guard-rail on the road and the vehicle V (or the LIDAR sensor 200), the guard-rail detection device 100 may detect the guard-rail based on the voxel closest from the vehicle V or the LIDAR sensor 200 among the voxels in which the first points are positioned.

Figure 4:
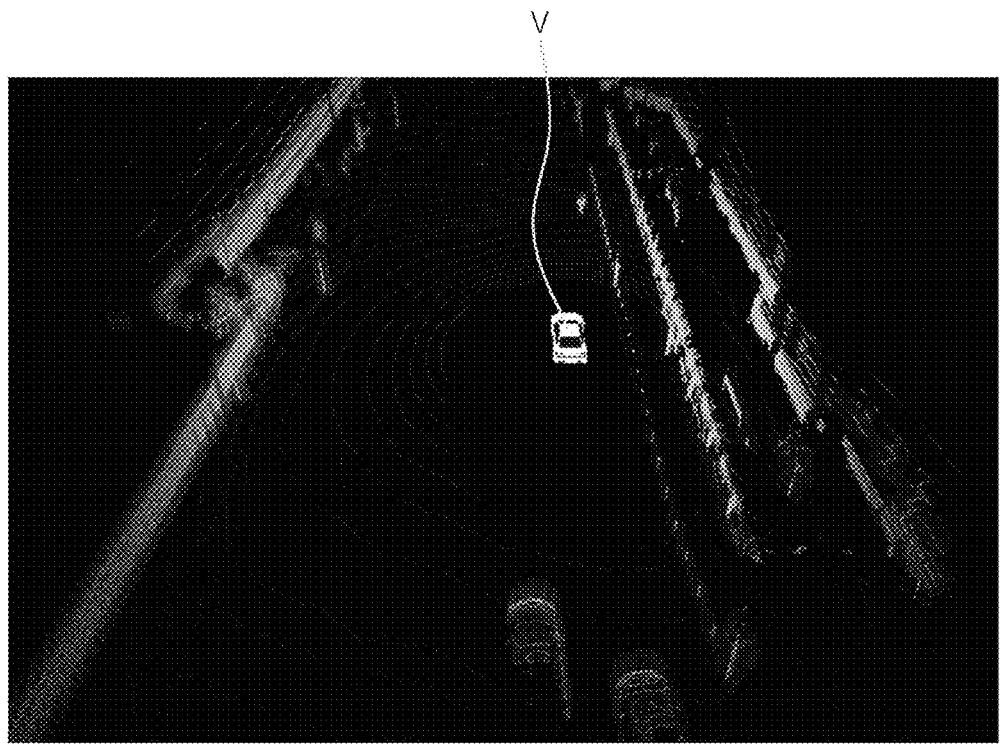
FIG. 4 illustrates a result of detecting directional representative voxels after eliminating a ground (ground surface) according to the embodiment of the present disclosure.

FIG. 4 illustrates a result of detecting directional representative voxels after eliminating a ground according to the embodiment of the present disclosure.

Referring to FIG. 4, the ground elimination unit 120 may eliminate points corresponding to the ground among the points received from the point data receiving unit 110, and the representative point detection unit 140 may select the directional representative voxels among the voxels generated by the voxel generation unit 130. For example, the representative point detection unit 140 may select voxels brightly indicated as white color except the vehicle V as the directional representative voxels. Since, the directional representative voxels may include other vehicles or other objects on the road except the guard-rail, the guard-rail detection device 100 may detect guard-rail candidate voxels among the directional representative voxels.

Figure 5:
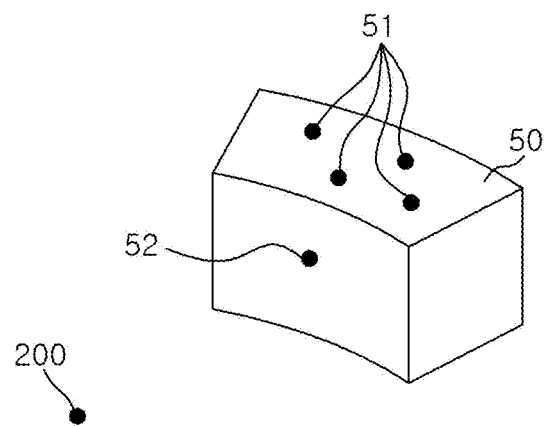
FIG. 5 illustrates a method for selecting directional representative points according to the embodiment of the present disclosure.

FIG. 5 illustrates a method for selecting directional representative points according to the embodiment of the present disclosure.

Referring to FIG. 5, the representative point detection unit 140 may detect one point from the first points located in each directional representative voxel as a directional representative point corresponding to each directional representative voxel. For example, the representative point detection unit 140 may detect the closest point 52 from the LIDAR sensor 200 that may be positioned at the center of voxels forming a sphere as the directional representative point, among the first points 51, 52 positioned in the directional representative voxel 50. The directional representative point detected by the representative point detection unit 140 is not limited to this, and the directional representative point may be detected by other methods such as a method of detecting the farthest point from the center of the voxels.

The representative point detection unit 140 may detect the directional representative point by pre-calculating the distance from the LIDAR sensor 200 positioned at the center in the course of generating the voxels for the convenience of calculation.

Figure 6A:
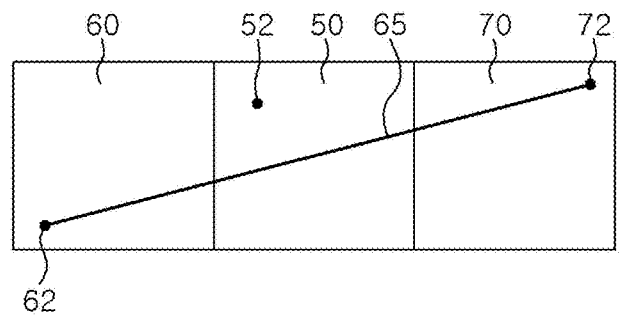
FIG. 6A illustrates a method for determining whether a directional representative voxel satisfies straightness in a theta direction and a phi direction according to the embodiment of the present disclosure.
Figure 6B:
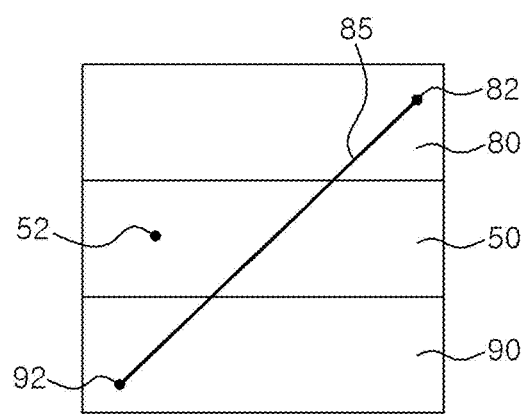
FIG. 6B illustrates a method for determining whether a directional representative voxel satisfies straightness in a theta direction and a phi direction according to the embodiment of the present disclosure.
Figure 6C:
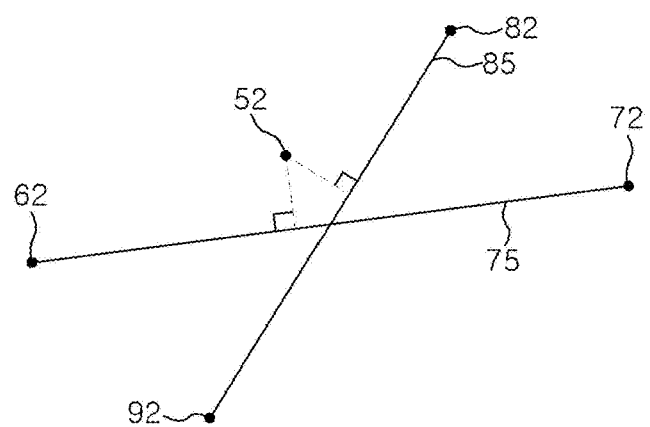
FIG. 6C illustrates a method for determining whether a directional representative voxel satisfies straightness in a theta direction and a phi direction according to the embodiment of the present disclosure.

FIGS. 6A and 6B illustrates a process for determining whether the directional representative voxel satisfies line fitting conditions for a first straight line and a second straight line generated by a first rule and a second rule in the theta direction and the phi direction, and FIG. 6C illustrates a method for determining whether the directional representative voxel satisfies planeness according to the embodiment of the present disclosure.

The guard-rail candidate detection unit 150 may determine whether each directional representative voxel satisfies the planeness. Further, in order to determine whether each directional representative voxel satisfies the planeness, the guard-rail candidate detection unit 150 may determine whether each directional representative voxel satisfies a line fitting condition for the first straight line 65 in the theta direction, and determine whether each directional representative voxel satisfies a line fitting condition for the second straight line 85 in the phi direction.

Referring to FIG. 6A, the guard-rail candidate detection unit 150 may select a planeness determination voxel 50, a first voxel 60 which is a directional representative voxel having the same phi direction coordinate with the planeness determination voxel 50 and having a theta direction coordinate smaller than the planeness determination voxel 50, and a second voxel 70 which is a directional representative voxel having the same phi direction coordinate as the planeness determination voxel 50 and having a theta direction coordinate larger than the planeness determination voxel 50, and determine whether the planeness determination voxel 50 satisfies a line fitting condition for the first straight line 65 in the theta direction. For example, if the planeness determination voxel 50 is positioned at ($R_k$, $T_m$, $P_n$), the first voxel 60 may be positioned at ($R_k$, $T_{m-1}$, $P_n$) which is adjacent to the planeness determination voxel 50, and the second voxel 70 may be positioned at ($R_k$, $T_{m+1}$, $P_n$) which is adjacent to the planeness determination voxel 50.

More specifically, the guard-rail candidate detection unit 150 may first generate the first straight line 65 connecting a directional representative point 62 of the first voxel 60 and a directional representative point 72 of the second voxel 70. Then, referring to FIG. 6C, the guard-rail candidate detection unit 150 may calculate a distance between a directional representative point 52 of the planeness determination voxel 50 and a point extended downward from the directional representative point 52 of the planeness determination voxel 50 to the first straight line 65. If the distance is equal to or less than a predetermined length, the guard-rail candidate detection unit 150 may determine that the planeness determination voxel 50 satisfies the line fitting condition for the first straight line 65 in the theta direction.

Referring to FIG. 6B, the guard-rail candidate detection unit 150 may select a planeness determination voxel 50, a third voxel 80 which is a directional representative voxel having the same theta direction coordinate as the planeness determination voxel 50 and having a phi direction coordinate smaller than the planeness determination voxel 50, and a fourth voxel 90 which is a directional representative voxel having the same theta direction coordinate as the planeness determination voxel 50 and having a phi direction coordinate larger than the planeness determination voxel 50, and determine whether the planeness determination voxel 50 satisfies a line fitting condition for the second straight line 85 in the phi direction. For example, if the planeness determination voxel 50 is positioned at $(R_k, T_m, P_n)$, the third voxel 80 may be positioned at $(R_k, T_m, P_{n-1})$ which is adjacent to the planeness determination voxel 50, and the fourth voxel 90 may be positioned at $(R_k, T_m, P_{n+1})$ which is adjacent to the planeness determination voxel 50.

More specifically, the guard-rail candidate detection unit 150 may first generate the second straight line 85 connecting a directional representative point 82 of the third voxel 80 and a directional representative point 92 of the fourth voxel 90. Then, referring to FIG. 6C, the guard-rail candidate detection unit 150 may calculate a distance between a directional representative point 52 of the planeness determination voxel 50 and a point extended downward from the directional representative point 52 of the planeness determination voxel 50 to the second straight line 85. If the distance is equal to or less than a predetermined length, the guard-rail candidate detection unit 150 may determine that the planeness determination voxel 50 satisfies the line fitting condition for the second straight line 85 in the phi direction.

The guard-rail candidate detection unit 150 may determine that a directional representative voxel satisfying the line fitting condition for the first straight line 65 in the theta direction and the line fitting condition for the second straight line 85 in the phi direction satisfies the planeness, and may detect directional representative voxels satisfying the planeness as guard-rail candidate voxels.

Figure 7:
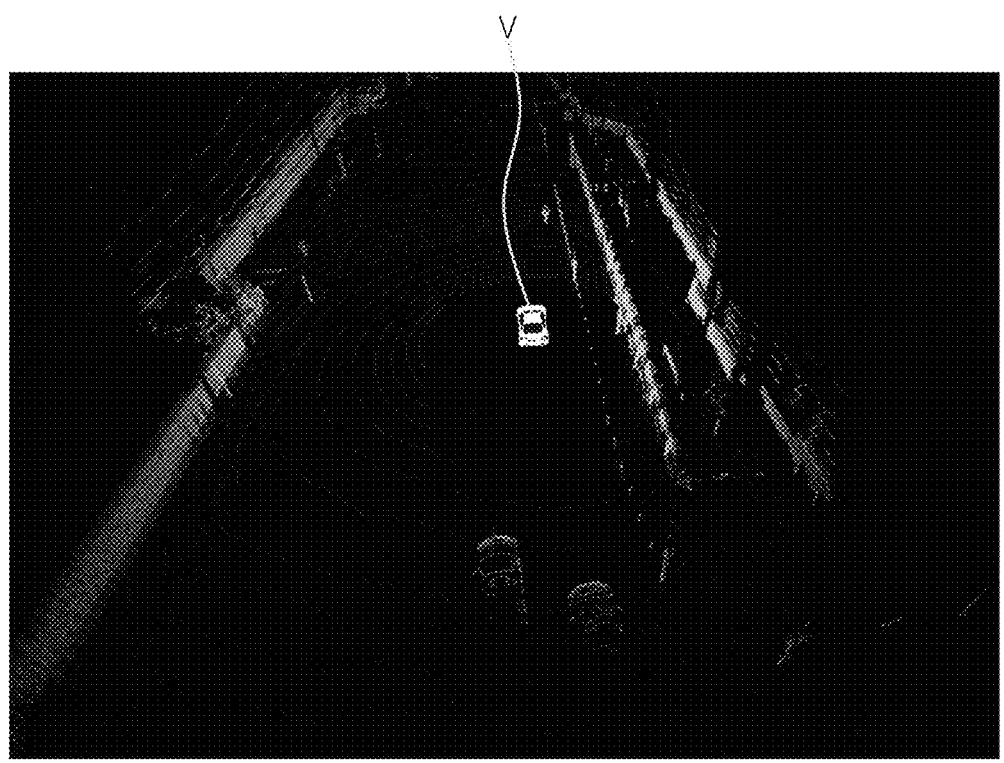
FIG. 7 illustrates guard-rail candidate voxels satisfying planeness according to the embodiment of the present disclosure.

FIG. 7 illustrates guard-rail candidate voxels satisfying planeness according to the embodiment of the present disclosure.

Referring to FIG. 7, the guard-rail candidate detection unit 150 may detect guard-rail candidate voxels satisfying the planeness indicated as white color except the vehicle V among the directional representative voxels. Since there may be other objects except the guard-rail among the guard-rail candidate voxels satisfying the planeness, the guard-rail detection device 100 may detect the guard-rail through additional classification afterwards.

Then, the guard-rail detection unit 160 may be formed by connecting the guard-rail candidate voxels detected by the guard-rail candidate detection unit 150 in an extended direction by connecting adjacent voxels using a conventional clustering technique. Meanwhile, the guard-rail detection unit may connect guard-rail candidate voxels of which a distance between guard-rail candidate voxels is within a predetermined distance.

The guard-rail detection unit 160 may detect at least one connected guard-rail candidate voxel as a guard-rail candidate. By using the characteristics of the guard-rail that it has a constant shape and has a relatively narrow width and a relatively long length, the guard-rail detection unit 160 may detect a guard-rail candidate having a width equal to or less than a predetermined width and a length equal to or larger than a predetermined length as the guard-rail among the at least one guard-rail candidate. Here, the width of the guard-rail candidate may indicate a width in a direction parallel to the ground and perpendicular to the extended direction, and the length of the guard-rail may indicate the length in the extended direction.

The size of the guard-rail including the width and the length may vary with the shape of the guard-rail or the road condition. For example, the guard-rail detection unit 160 may detect a guard-rail candidate having a width of 1 meter or less and a length of 25 meters or above as the guard-rail.

Figure 8:
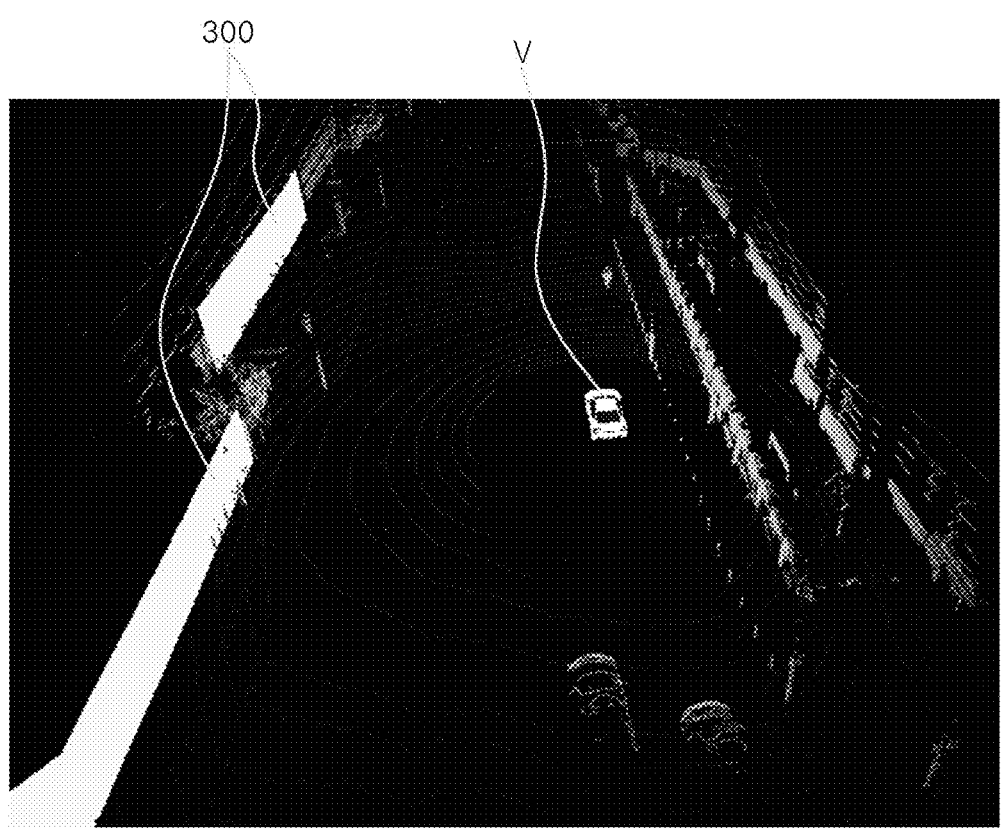
FIG. 8 illustrates the guard-rail detected according to the embodiment of the present disclosure.

FIG. 8 illustrates the guard-rail detected according to the embodiment of the present disclosure.

Referring to FIG. 8, the guard-rail detection unit 160 may finally detect the guard-rail candidate having a width of 1 meter or less and a length of 25 meters or above as the guard-rail 300 among the guard-rail candidates.

Figure 9:
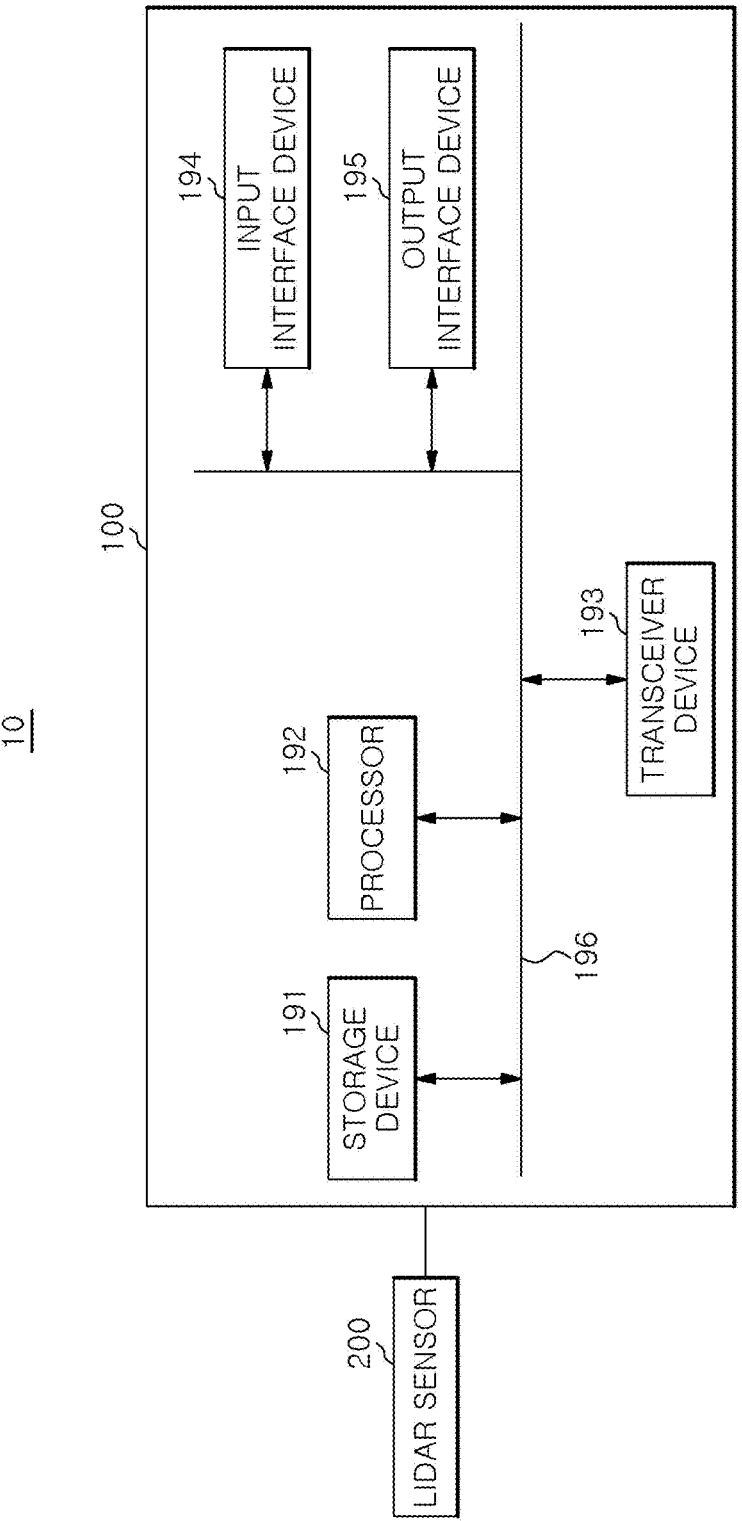
FIG. 9 is a block diagram for explaining the guard-rail detection device in aspect of hardware.

FIG. 9 is a block diagram for explaining the guard-rail detection device in aspect of hardware.

Referring to FIG. 1 and FIG. 9, the guard-rail detection device 100 may include a storage device 191 for storing at least one command, a processor 192 for executing the at least one command of the storage device 191, a transceiver device 193, an input interface device 194, and an output interface device 195.

Each of the components 191, 192, 193, 194, 195 included the guard-rail detection device 100 may communicate with each other by data bus 196.

The storage device 191 may include at least one of a memory, a volatile storage medium, or a non-volatile storage medium. For example, the storage device 191 may include at least one of a read only memory (ROM) or a random access memory (RAM).

The storage device 191 may further include at least one command to be executed by the processor 192, and may store therein information about a shape of the guard-rail input by a user from the input interface device 194, a position of a generated voxel, point data, and so on.

The processor 192 may be implemented by a central processing unit (CPU), a graphics processing unit (GPU), a micro controller unit (MCU), or a dedicated processor by which methods according to embodiments of the present disclosure are performed.

Referring to FIG. 1, as described above, the processor 192 may perform the functions of the ground elimination unit 110, the voxel generation unit 120, the representative point detection unit 140, the guard-rail candidate detection unit 150 and the guard-rail detection unit 160, by at least one program command stored in the storage device 191, and each function may be performed by the processor with being stored in a memory in the form of at least one module.

The transceiver device 193 may transmit or receive data from an internal device or an external device connected by communication, and perform the function of point data receiving unit 110. For example, the transceiver device 193 may receive point data acquired from the LIDAR sensor 200.

The input interface device 194 may receive input of at least one control signal or set number from a user. For example, the input interface device 194 may receive a reference of a shape including a width and a length of the guard-rail, or receive a user input such as a command for starting the guard-rail detection.

The output interface device 195 may output and show at least one information including a position of the guard-rail by the operation of the processor 192.

The guard-rail detection device according to an embodiment of the present disclosure has been explained.

From now on, a method for detecting the guard-rail performed by the operation of the processor inside the guard-rail detection device according to another embodiment of the present disclosure.

Figure 10:
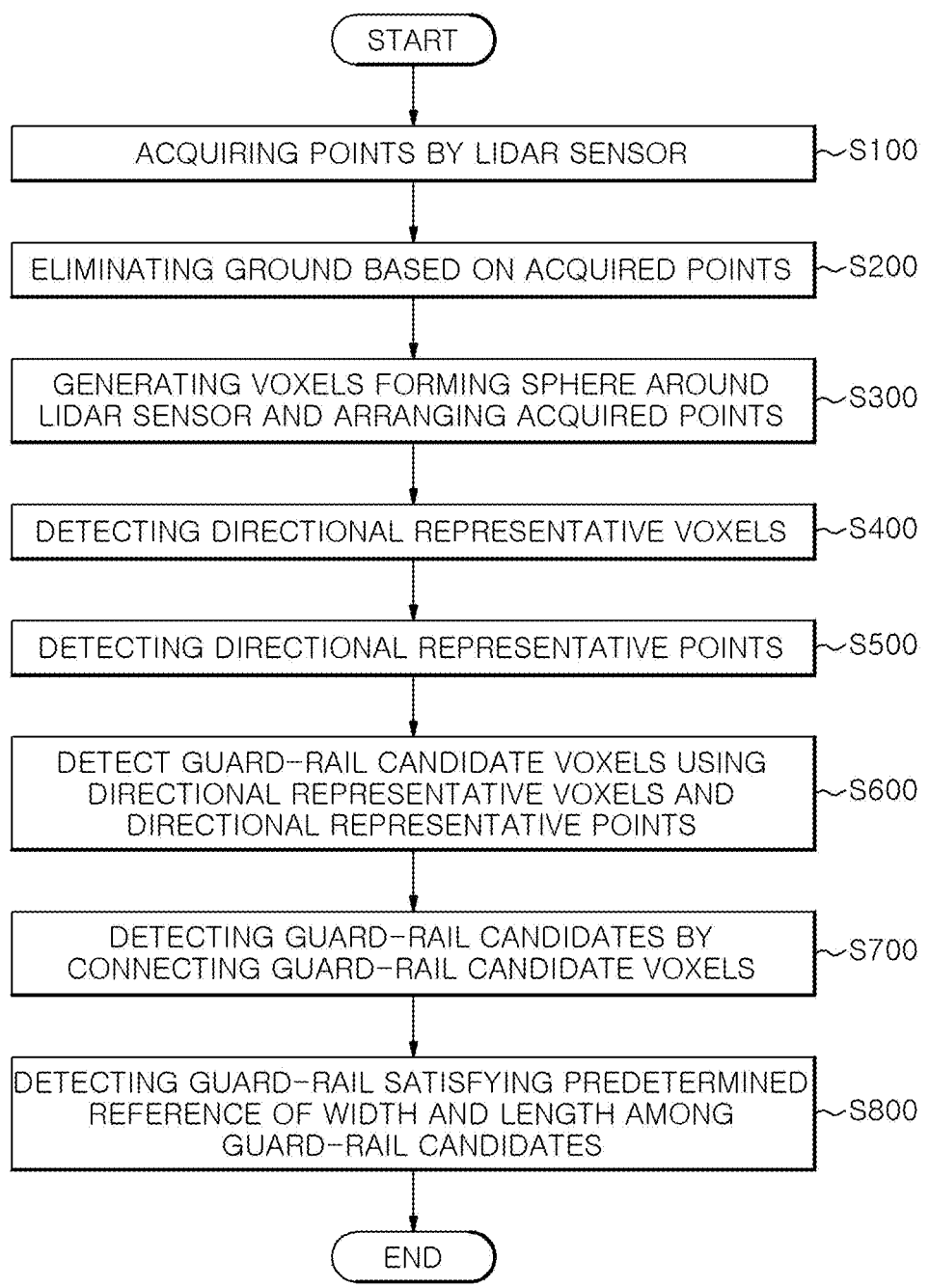
FIG. 10 is a flowchart of a method for detecting the guard-rail according to the embodiment of the present disclosure.

FIG. 10 is a flowchart of a method for detecting the guard-rail according to the embodiment of the present disclosure.

Referring to FIG. 1, FIGS. 2A and 2B, and FIG. 10, the transceiver device 193 may acquire data from the LIDAR sensor 200 (S100).

The processor 192 may detect points on the ground using the known techniques such as a plane fitting and a ground detection based on a grid map, based on the acquired point data, and may eliminate the points on the ground (S200).

Then, the processor 192 may generate voxels forming a sphere around the LIDAR sensor 200 or the vehicle, and arrange points that are not positioned on the ground among the points acquired from the LIDAR sensor 200 (S300).

The processor 192 may detect directional representative points based on the arranged points and the generated voxels (S400, S500).

Then, the processor 192 may determine whether each directional representative voxel satisfies the planeness by determining whether each directional representative voxel satisfies a line fitting in the theta direction and a line fitting in the phi direction, and detect the directional representative voxels satisfying the planeness as the guard-rail candidate voxels (S600).

The processor 192 may detect the guard-rail candidates by connecting adjacent guard-rail candidate voxels, and detect the guard-rail candidates satisfying a predetermined reference of a width and a length as the guard-rail on the road (S700, S800).

Thus, in accordance with the device and the method according to the embodiments of the present disclosure, by detecting the position of the guard-rail around the vehicle by units of voxels, it is possible to easily and rapidly detect the position of the guard-rail on the road without using all of the point data acquired from the LIDAR sensor.

The combinations of respective blocks of block diagrams and respective sequences of a flow diagram attached herein is carried out by computer program instructions which are executed through various computer means and recorded in a non-transitory computer-readable recording medium. Since the computer program instructions is loaded in processors of a general purpose computer, a special purpose computer, or other programmable data processing apparatus, the instructions, carried out by the processor of the computer or other programmable data processing apparatus, create means for performing functions described in the respective blocks of the block diagrams or in the respective sequences of the sequence diagram. Since the computer program instructions, in order to implement functions in specific manner, is stored in a memory unit, which comprises non-transitory computer-readable medium, useable or readable by a computer or a computer aiming for other programmable data processing apparatus, the instruction stored in the memory unit useable or readable by a computer produces manufacturing items including an instruction means for performing functions described in the respective blocks of the block diagrams and in the respective sequences of the sequence diagram. Since the computer program instructions are loaded in a computer or other programmable data processing apparatus, instructions, a series of sequences of which is executed in a computer or other programmable data processing apparatus to create processes executed by a computer to operate a computer or other programmable data processing apparatus, provides operations for executing functions described in the respective blocks of the block diagrams and the respective sequences of the flow diagram. The computer program instructions are also performed by one or more processes or specifically configured hardware (e.g., by one or more application specific integrated circuits or ASIC(s)). The non-transitory computer-readable recording medium includes, for example, a program command, a data file, a data structure and the like solely or in a combined manner. The program command recorded in the medium is a program command specially designed and configured for the present disclosure or a program command known to be used by those skilled in the art of the computer software. The non-transitory computer-readable recording medium includes, for example, magnetic media, such as a hard disk, a floppy disk and a magnetic tape, optical media, such as a CD-ROM and a DVD, magneto-optical media, such as a floptical disk, and hardware devices specially configured to store and execute program commands, such as a ROM, a RAM, a flash memory and the like. The program command includes, for example, high-level language codes that can be executed by a computer using an interpreter or the like, as well as a machine code generated by a compiler. The hardware devices can be configured to operate using one or more software modules in order to perform the operation of the present disclosure, and vice versa. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

Moreover, the respective blocks or the respective sequences in the appended drawings indicate some of modules, segments, or codes including at least one executable instruction for executing a specific logical function(s). In several alternative embodiments, it is noted that the functions described in the blocks or the sequences run out of order. For example, two consecutive blocks and sequences are substantially executed simultaneously or often in reverse order according to corresponding functions.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A method for detecting a guard-rail on a road, which is performed by a guard-rail detection device, the method comprising:
    acquiring points around a LIDAR sensor from the LIDAR sensor;
    detecting ground points based on the acquired points;
    arranging, among the acquired points, first points that are different from the detected ground points in voxels forming a sphere; and
    detecting the guard-rail based on the voxels and the first points.

2. The method of claim 1, wherein the detecting of the guard-rail comprises:
    generating a plurality of voxel groups by classifying voxels, having a same theta direction coordinate and a same phi direction coordinate, as a same group among the voxels in which the first points are arranged;

selecting a closest voxel from the LIDAR sensor among the voxels in each of the plurality of voxel groups as a directional representative voxel for each of the plurality of voxel groups;

determining whether the respective directional representative voxels for the plurality of voxel groups satisfy planeness;

selecting, among the respective directional representative voxels for the plurality of voxel groups, directional representative voxels satisfying planeness as guard-rail candidate voxels; and selecting a guard-rail candidate by connecting the guard-rail candidate voxels.

3. The method of claim 2, wherein the determining of whether the respective directional representative voxels for the plurality of voxel groups satisfy planeness comprises:

selecting, among a plurality of points positioned in each of the respective directional representative voxels for the plurality of voxel groups, a directional representative point for each of the directional representative voxels.

4. The method of claim 3, wherein the determining of whether the respective directional representative voxels for the plurality of voxel groups satisfy planeness comprises:

for each of the directional representative voxels, selecting a first voxel that is a directional representative voxel having a same phi direction coordinate as the corresponding directional representative voxel and having a theta direction coordinate that is larger than that of the corresponding directional representative voxel, and a second voxel that is a directional representative voxel having a same phi direction coordinate as the corresponding directional representative voxel and having a theta direction coordinate that is smaller than that of the corresponding directional representative voxel, and determining whether the corresponding directional representative voxel satisfies a line fitting condition for a first straight line generated by a predetermined first rule in the theta direction;

selecting a third voxel that is a directional representative voxel having a same theta direction coordinate as the corresponding directional representative voxel and having a phi direction coordinate that is larger than that of the corresponding directional representative voxel, and a fourth voxel that is a directional representative voxel having a same theta direction coordinate as the corresponding directional representative voxel and having a phi direction coordinate smaller than that of the corresponding directional representative voxel, and determining whether the corresponding directional representative voxel satisfies a line fitting condition for a second straight line generated by a predetermined second rule in the phi direction; and when the corresponding directional representative voxel satisfies the line fitting condition for the first straight line and the line fitting condition for the second straight line, determining that the corresponding directional representative voxel satisfies planeness.

5. The method of claim 4, wherein the first straight line is generated by connecting the directional representative point of the first voxel and the directional representative point of the second voxel, and wherein the determining of whether the corresponding directional representative voxel satisfies the line fitting condition for the first straight line comprises:

determining that the corresponding directional representative voxel satisfies the line fitting condition for the first straight line when a distance between the directional representative point of the corresponding directional representative voxel and the first line is equal to or less than a predetermined distance.

6. The method of claim 4, wherein the second straight line is generated by connecting the directional representative point of the third voxel and the directional representative point of the fourth voxel, and wherein the determining of whether the corresponding directional representative voxel satisfies the line fitting condition for the second straight line comprises:

determining that the corresponding directional representative voxel satisfies the line fitting condition for the second straight line when a distance between the directional representative point of the corresponding directional representative voxel and the second line is equal to or less than a predetermined distance.

7. The method of claim 4, wherein the first voxel and the second voxel are adjacent to the corresponding directional representative voxel, and the third voxel and the fourth voxel are adjacent to the corresponding directional representative voxel.

8. The method of claim 2, wherein the guard-rail candidate selected in the selecting of the guard-rail candidate is formed by connecting the guard-rail candidate voxels adjacent to each other in an extended direction.

9. The method of claim 8, further comprising:

detecting, as the guard rail, the guard-rail candidate having a width in a direction parallel to a ground and perpendicular to the extended direction and having a length in the extended direction, the width being equal to or less than a predetermined width and the length being equal to or larger than a predetermined length.

10. A guard-rail detection device comprising:

a LIDAR sensor configured to acquire points around the LIDAR sensor; and a processor configured to detect ground points based on the acquired points, arrange, among the acquired points, first points that are different from the detected ground points in voxels forming a sphere, and detect a guard-rail based on the voxels and the first points.

11. A non-transitory computer-readable storage medium storing computer-executable instructions which cause, when executed by a processor, the processor to perform a method for detecting a guard-rail on a road by using a guard-rail detection device, the method comprising:

acquiring points around a LIDAR sensor from the LIDAR sensor;

detecting ground points based on the acquired points;

arranging, among the acquired points, first points that are different from the detected ground points in voxels forming a sphere; and detecting the guard-rail based on the voxels and the first points.

12. The non-transitory computer-readable storage medium of claim 11, wherein the detecting of the guard-rail comprises:

generating a plurality of voxel groups by classifying voxels, having a same theta direction coordinate and a same phi direction coordinate, as a same group among the voxels in which the first points are arranged;

selecting a closest voxel from the LIDAR sensor among the voxels in each of the plurality of voxel groups as a directional representative voxel for each of the plurality of voxel groups;

determining whether the respective directional representative voxels for the plurality of voxel groups satisfy planeness;

selecting, among the respective directional representative voxels for the plurality of voxel groups, directional representative voxels satisfying planeness as guard-rail candidate voxels; and selecting a guard-rail candidate by connecting the guard-rail candidate voxels.

13. The non-transitory computer-readable storage medium of claim 12, wherein the determining of whether the respective directional representative voxels for the plurality of voxel groups satisfy planeness comprises:

selecting, among a plurality of points positioned in each of the respective directional representative voxels for the plurality of voxel groups, a directional representative point for each of the directional representative voxels.

14. The non-transitory computer-readable storage medium of claim 13, wherein the determining of whether the respective directional representative voxels for the plurality of voxel groups satisfy planeness comprises:

for each of the directional representative voxels, selecting a first voxel that is a directional representative voxel having a same phi direction coordinate as the corresponding directional representative voxel and having a theta direction coordinate that is larger than that of the corresponding directional representative voxel, and a second voxel that is a directional representative voxel having a same phi direction coordinate as the corresponding directional representative voxel and having a theta direction coordinate that is smaller than that of the corresponding directional representative voxel, and determining whether the corresponding directional representative voxel satisfies a line fitting condition for a first straight line generated by a predetermined first rule in the theta direction;

selecting a third voxel that is a directional representative voxel having a same theta direction coordinate as the corresponding directional representative voxel and having a phi direction coordinate that is larger than that of the corresponding directional representative voxel, and a fourth voxel that is a directional representative voxel having a same theta direction coordinate as the corresponding directional representative voxel and having a phi direction coordinate smaller than that of the corresponding directional representative voxel, and determining whether the corresponding directional representative voxel satisfies a line fitting condition for a second straight line generated by a predetermined second rule in the phi direction; and when the corresponding directional representative voxel satisfies the line fitting condition for the first straight line and the line fitting condition for the second straight line, determining that the corresponding directional representative voxel satisfies planeness.

15. The non-transitory computer-readable storage medium of claim 14, wherein the first straight line is generated by connecting the directional representative point of the first voxel and the directional representative point of the second voxel, and wherein the determining of whether the corresponding directional representative voxel satisfies the line fitting condition for the first straight line comprises:

determining that the corresponding directional representative voxel satisfies the line fitting condition for the first straight line when a distance between the directional representative point of the corresponding directional representative voxel and the first line is equal to or less than a predetermined distance.

16. The non-transitory computer-readable storage medium of claim 14, wherein the second straight line is generated by connecting the directional representative point of the third voxel and the directional representative point of the fourth voxel, and wherein the determining of whether the corresponding directional representative voxel satisfies the line fitting condition for the second straight line comprises:

determining that the corresponding directional representative voxel satisfies the line fitting condition for the second straight line when a distance between the directional representative point of the corresponding directional representative voxel and the second line is equal to or less than a predetermined distance.

17. The non-transitory computer-readable storage medium of claim 14, wherein the first voxel and the second voxel are adjacent to the corresponding directional representative voxel, and the third voxel and the fourth voxel are adjacent to the corresponding directional representative voxel.

18. The non-transitory computer-readable storage medium of claim 12, wherein the guard-rail candidate selected in the selecting of the guard-rail candidate is formed by connecting the guard-rail candidate voxels adjacent to each other in an extended direction.

19. The non-transitory computer-readable storage medium of claim 18, wherein the method further comprises detecting, as the guard rail, the guard-rail candidate having a width in a direction parallel to a ground and perpendicular to the extended direction and having a length in the extended direction, the width being equal to or less than a predetermined width and the length being equal to or larger than a predetermined length.

* * * * *